UNITED STATES PATENT OFFICE.

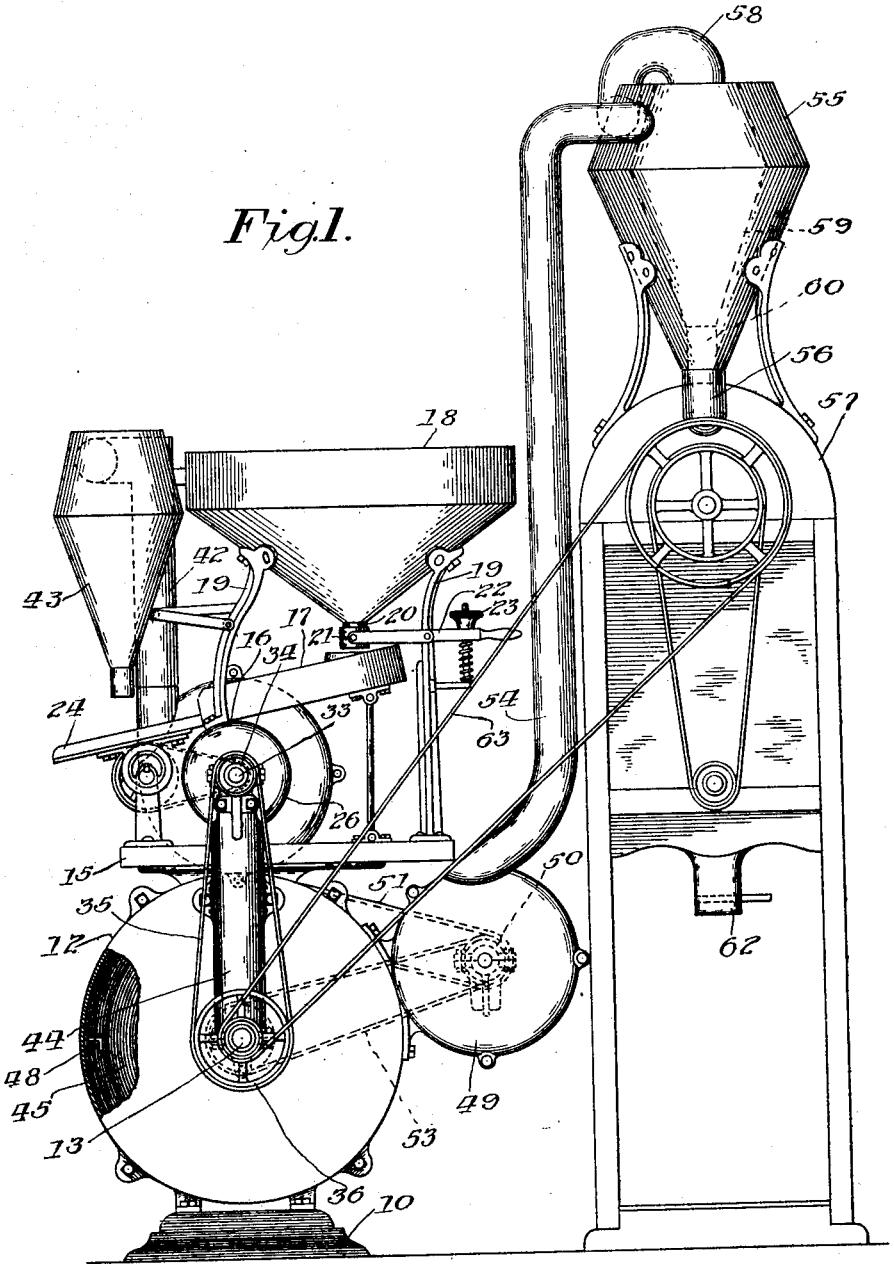

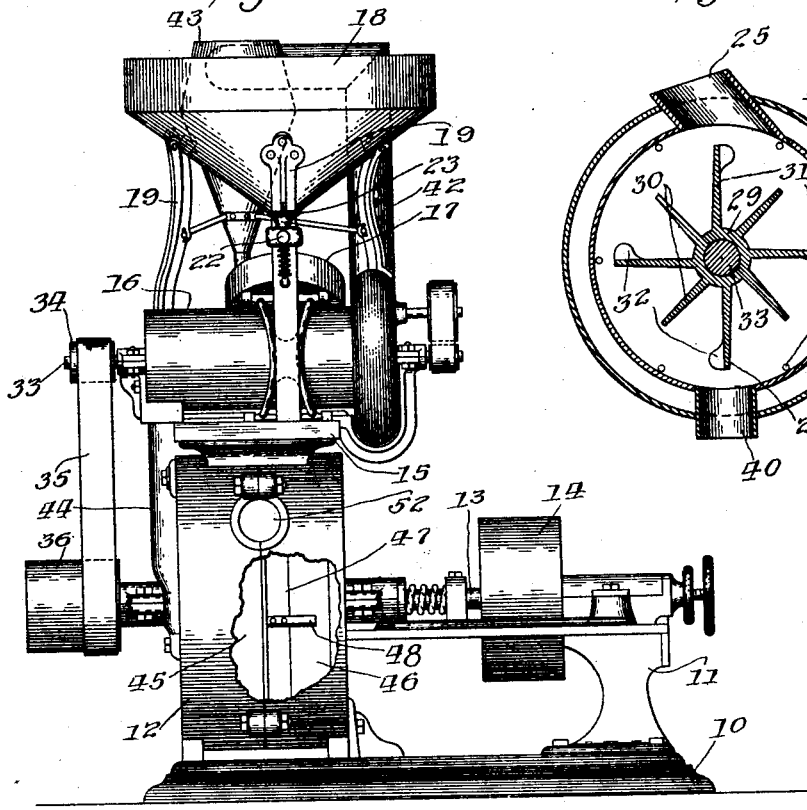
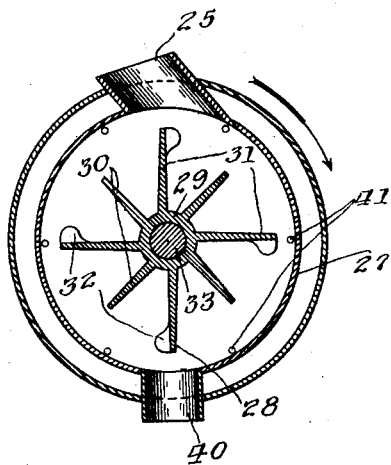
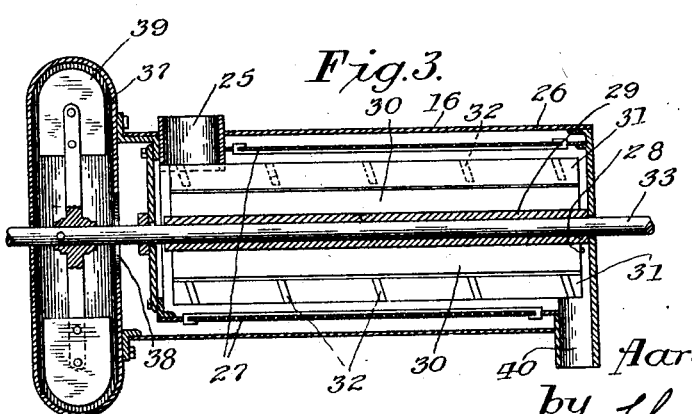

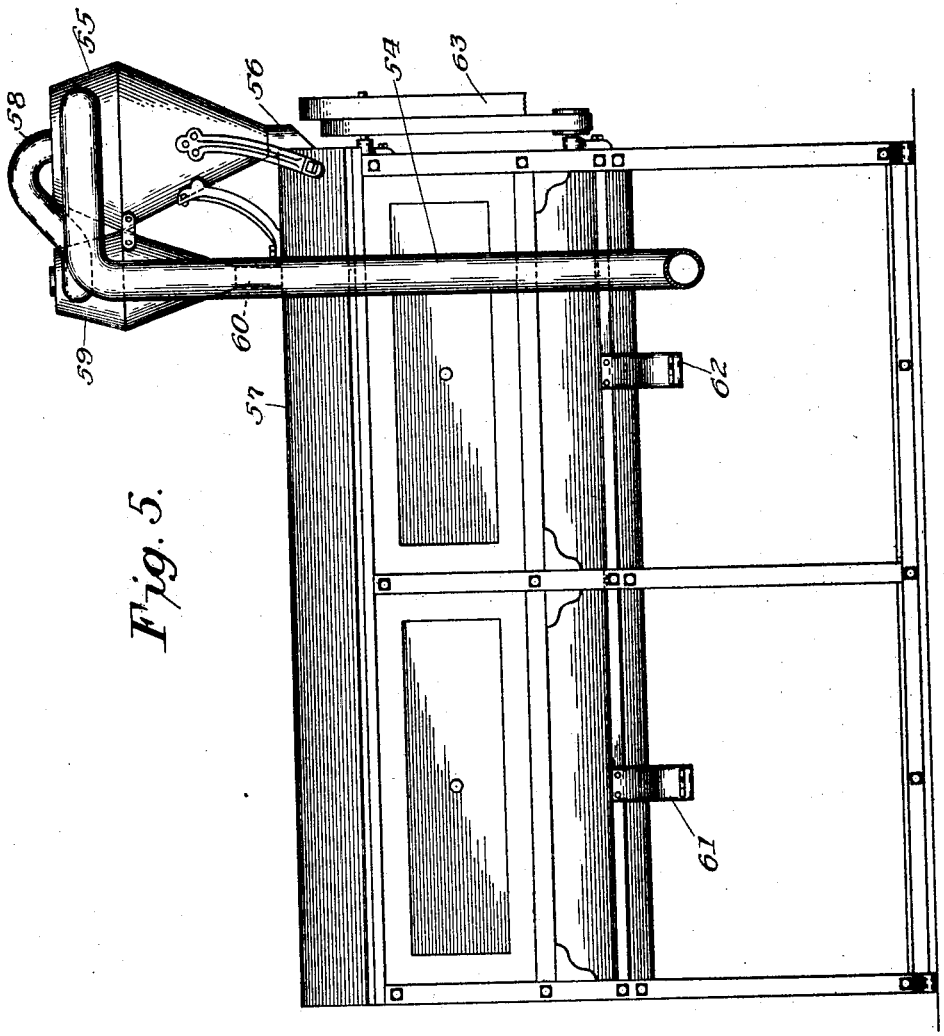

AARON P. GOULD, OF NORTH WILKESBORO, NORTH CAROLINA, ASSIGNOR TO W. C. MEADOWS MILL COMPANY, A CORPORATION OF NORTH CAROLINA.

GRAIN-CLEANING MECHANISM.

1,383,463.

Specification of Letters Patent.  Patented July 5, 1921.

Application filed April 20, 1918. Serial No. 229,744.

*To all whom it may concern:*

Be it known that I, AARON P. GOULD, a citizen of the United States, residing at North Wilkesboro, in the county of Wilkes and State of North Carolina, have invented certain new and useful Improvements in Grain-Cleaning Mechanism, of which the following is a full, clear, and exact specification.

This invention relates to mills, and more particularly to mills for producing flour, such as rice, corn meal, rye, whole wheat, barley, graham, buckwheat, etc.

The object of the invention is to improve the cleaning or scouring mechanism of flour mills, and to provide a new and improved combination of elements constituting the grain scouring mechanism so that the mill will have a large capacity and will produce a superior grade of flour but will occupy a minimum amount of space.

In the accompanying drawings I have illustrated one embodiment of the invention, and in these drawings,—

Figure 1 shows a side elevation of the combined cleaning, grinding and sifting mechanism;

Fig. 2 shows a front elevation, partly broken away, of the cleaning and grinding mechanism;

Fig. 3 is a longitudinal sectional view of the cleaning mechanism;

Fig. 4 is a transverse sectional view of the construction shown in Fig. 3; and

Fig. 5 is a front elevation showing the flour bolter or sifting mechanism.

The hopper, cleaning and grinding mechanism is supported on a base 10 which carries a bracket 11 at one end thereof and at the other end a casing 12 for the grinding mechanism. The main drive shaft 13 for the various mechanisms is journaled in the bracket 11 and in casing 12, and carries a pulley 14 which is connected to a suitable source of power. The casing 12 for the grinding mechanism supports a plate 15 which in turn carries the cleaning cylinder 16, oscillatory sieve 17 or screen, and the hopper 18, the latter being supported by suitable brackets 19 which extend upwardly from the plate 15 and from the casing of the cleaning cylinder.

The hopper 18 is provided with a chute 20 at its lower end and the passage of the grain through this chute is controlled by suitable valve mechanism 21 which in turn is regulated by lever 22 and the thumb screw 23. Immediately below the chute 20 and valve 21 there is disposed the screen 17 which may be of any suitable construction, such for instance as that shown in Patent No. 999,835, April 19, 1911. The screen 17 is pivotally connected with the plate 15 by means of a link and the screen is oscillated by an eccentric carried by a stub shaft which is rotated by means of a belt and pulley connection with the shaft of the cleaning mechanism. This construction is not described here in detail since it is fully shown and described in the patent referred to, and *per se* forms no part of the present invention. By means of this screen or sieve, the coarse, foreign matter such as broken corn cobs, husks, silk or gravel, is sifted out and passes downwardly over the exit chute 24, the remaining material being conducted through the sieve 17 and through a passageway 25 into the cleaning or scouring mechanism 16. This cleaning mechanism comprises a cylindrical outer casing 26 in which is contained a perforated cylindrical casing 27, the passageway 25 leading through the outer casing 26 into the perforated cylinder 27. This cylinder 27 incloses a beater 28 which is made up of a central sleeve member 29 and a series of outwardly projecting beater blades 30 and 31.

As clearly shown in Fig. 4, the beater arms 31 are slightly wider than the blades 30 and carry at their outer ends inclined vanes 32, the radial width of which is substantially the same as the difference in width between the blades 31 and 30, so that they act only on material thrown beyond blades 30. The beater 28 is secured to a shaft 33 and is rotated from the main driving shaft 13 by means of a belt and pulley connection 34, 35 and 36. At one end of the cylindrical casing 26 there is secured a fan casing 37 provided with a central opening 38 on the side secured to the casing 26 and inclosing a fan 39 which is also secured to the shaft 33. An exit opening 40 is provided in the cylindrical casing 26 and perforated cylinder 27 as shown in Figs. 3 and 4.

The perforated cylinder 27 is provided on its inner surface with a series of longitudinally extending widely separated rods 41 which act as baffle members in a manner hereinafter described.

The operation of the cleaning cylinder will now be briefly set forth.

The material which passes through the screen 17 and opening 25 is conducted to the interior of the cylindrical casing 27 and there comes in contact with the rapidly revolving blades 30 and 31 of the beater 28. By these blades it is thrown against the outer perforated wall of the cylinder 27 and against the longitudinal rods 41. It is gradually conducted by the angularly disposed vanes 32 from the entrance to the exit end of the perforated cylinder 27 and as it is being so conducted it is thrown back and forth against the arms 30 and 31 and the cylindrical wall of the casing and the rods 41 and is in this way cleaned and polished. The fine material such as dust, fuzz, smut, etc., is thrown through the perforations in the cylinder 27 into the outer casing 26. This fine dust and other material is sucked through the opening 38 into the fan casing 39 and from this casing is conducted by conduit 42 into the cyclone separator 43, where the dust and waste matter is collected and conducted downwardly onto the chute 24 and passes out of the machine.

The cleaned material which passes downwardly through the opening 40 is conducted by conduit 44 to the central openings in the grinding burs 45 and 46. The bur 45 is stationary and is held in fixed position by any suitable means, and the bur 46 is rotatably mounted on the shaft 13. The rotary bur is provided on its periphery with a band 47, preferably formed of steel, and this band carries outwardly projecting fan blades 48. These blades 48 create a current of air between the grinding burs and draw the air in at the center of the burs and force it over the surface, thereby cooling the flour which has become heated by grinding, preventing the flour from burning and producing a superior grade of flour. The blades also create a fan blast which may be utilized to conduct the meal from the casing of the grinding burs to a bolter or through sifting mechanism.

In the embodiment of the invention illustrated, I have shown a supplemental fan 49 secured to the casing of the grinding mill, and having a central aperture 50 connected by a conduit 51 to a suitable opening 52 in the grinding mill casing. This fan is driven by a belt connection 53 to the drive shaft 13. From the fan 49 the ground meal is conducted by a conduit 54 to a cyclone separator 55, where the air and meal are separated, the meal passing downwardly through a chute 56 into the bolter 57. It may be possible that fine particles of flour will be carried upward out of the central opening in the cyclone separator 55, and to prevent the loss of these fine particles, a conduit 58 is provided, this conduit leading from the central aperture of the cyclone separator 55 to a supplemental separator 59, where the flour and air are again separated, the flour passing downwardly through a chute 60 into the bolter 57. The bolter 57 may be of any standard construction and in this bolter the various grades of flour are separated, the lighter grades floating on the heavier grades, and passing out of the left hand exit chute 61, the heavier grades passing out of the right hand exit 62.

In the arrangement of the device illustrated in the drawings, the bolter is driven from the main drive shaft 13 by means of a belted connection 63.

The operation of the various parts of the cleaning, grinding and sifting mechanisms will now be briefly described.

The material to be operated upon is fed into the hopper 18 and passes through the chute 20 and valve 21 into the sieve 17 where the coarse material, such as corn cobs, gravel, etc., is separated and passes out of the machine. The material which passes through the sieve enters the cleaning or scouring cylinder through the opening 25 and is agitated by the beater 28 and fed gradually through the perforated cylinder 27 from the entrance end to the exit end. As the material passes through this perforated cylinder it is cleaned and polished and the fine foreign matter such as dust, dirt, fuzz, smut, etc., passes outwardly through the perforations in the cylinder 27 and is sucked into the fan casing 37 and passes therefrom through the conduit 42 into the cyclone separator 43. The cleaned grain passes through the opening 40 and conduit 44 into the casing of the grinding mechanism and is there ground, passing outwardly between the stationary bur and the rotary bur. The flour is cooled by means of the current of air created by the fans 48 and is forced by this current or by a supplemental fan, such as 49, through the conduit 54 into a cyclone separator, where the air and the flour are separated, the flour passing downwardly into the bolter to be graded in the well known manner. The fine flour blown upwardly with the air from the separator 55 is conducted to an auxiliary separator 59 where it is separated from the air and passes downwardly through a chute 60 into the bolter.

From the above description it will be seen that I have provided an exceedingly simple and compact arrangement of elements for cleaning grain. The arrangement of elements shown occupies a very small space, and by actual test this arrangement has been found to have a very large capacity for the size of the unit, and to produce a very superior grade of flour.

While I have in the above specification described one embodiment of my invention, 1 it should be understood that the invention is capable of modification, and that modifications may be adopted without departing from the spirit and scope of the invention as expressed by the following claims.

I claim—

1. Cleaning mechanism for grain mills comprising a drum, and a rotary beater carried by said drum, said beater having a plurality of elongated radially disposed flat blades, certain of said blades having a plurality of inclined grain conducting vanes extending laterally from one side thereof with the outer edges of the vanes and blades in the same plane.

2. In cleaning mechanism for grain mills, a rotary beater having elongated radial beater blades of different widths, inclined vanes extending laterally from the outer edge of the wider blades and a cylindrical casing surrounding said beater.

3. In cleaning mechanism for grain mills, a perforated drum, longitudinally extending spaced rods secured to the inner surface of the drum, a rotary beater within the drum provided with elongated radial blades, the outer edges of which pass in proximity to said rods, and a plurality of inclined grain conducting vanes extending from one side of said blades at their outer edges.

4. In cleaning mechanism for grain mills, a rotary beater having alternating wide and narrow elongated radial beater blades and inclined vanes of a width substantially equal to the difference between the wide and narrow blades extending laterally from one side of the wider blades for feeding material as it is being agitated.

5. In cleaning mechanism for grain mills, a rotary beater having radial flat blades of different widths, narrow blades being disposed between wider blades, the projecting portions of said wider blades being provided adjacent their outer edges and on one side with means for directing the grain from one end of the beater to the other end thereof.

In testimony whereof I affix my signature.

AARON P. GOULD.